(12) United States Patent
Coleman

(10) Patent No.: US 10,571,930 B2
(45) Date of Patent: Feb. 25, 2020

(54) METHOD AND SYSTEM FOR LANDING AN UNMANNED AERIAL VEHICLE

(71) Applicant: Ford Global Technologies, LLC, Dearborn, MI (US)

(72) Inventor: Jonathan H. Coleman, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/998,832

(22) Filed: Aug. 16, 2018

(65) Prior Publication Data

US 2019/0138028 A1    May 9, 2019

(30) Foreign Application Priority Data

Aug. 16, 2017  (GB) .................................. 1713161.6

(51) Int. Cl.
*G05D 1/04* (2006.01)
*G05D 1/06* (2006.01)
(Continued)

(52) U.S. Cl.
CPC ............. *G05D 1/042* (2013.01); *B60P 3/11* (2013.01); *B60W 30/18009* (2013.01); *B64C 7/00* (2013.01); *B64C 39/024* (2013.01); *B64F 1/364* (2013.01); *G05D 1/0684* (2013.01); *B60W 2550/408* (2013.01); *B60W 2720/10* (2013.01); *B64C 2201/18* (2013.01)

(58) Field of Classification Search
CPC ....... B64C 7/00; B64C 27/006; B64C 39/024; B64C 2201/042; B64C 2201/18; B64C 2201/208; B60W 30/18009; B60W 2550/408; B60W 2720/10; B64F 1/02; B64F 1/22; B64F 1/222; B64F 1/364; B60P 3/11; G05D 1/042
USPC ......................................................... 701/16
See application file for complete search history.

(56) References Cited

U.S. PATENT DOCUMENTS 8,418,959 B2    4/2013  Kang et al.
8,996,207 B2*   3/2015  Goossen .................. G08G 5/02
                                                           701/18
(Continued)

FOREIGN PATENT DOCUMENTS

CN    104760705 A    7/2015
CN    105460218 A    4/2016
CN    205750546 U    11/2016

OTHER PUBLICATIONS

Morby, Alice., "Land Rover unveils drone-equipped Discovery for search and rescue operations". Published Mar. 10, 2017. https://www.dezeen.com/2017/03/10/land-rover-red-cross-drone-equipped-discovery-search-rescue-operations-design-transport-cars/.

*Primary Examiner* — Joshua E Rodden
(74) *Attorney, Agent, or Firm* — Brandon Hicks; Eversheds Sutherland (US) LLP

(57) ABSTRACT

A method (100) of landing an unmanned aerial vehicle (101) on another vehicle (103), the method including: determining (110) the velocity of the unmanned aerial vehicle; determining (120) the velocity of the other vehicle; and adjusting (130) the velocity of at least one of the unmanned aerial vehicle and the other vehicle to ensure that the difference between the velocity of the unmanned aerial vehicle and the velocity of the other vehicle is greater than a predetermined amount as the unmanned aerial vehicle lands on the other vehicle.

11 Claims, 3 Drawing Sheets

(51) Int. Cl.
*B60P 3/11* (2006.01)
*B60W 30/18* (2012.01)
*B64C 7/00* (2006.01)
*B64C 39/02* (2006.01)
*B64F 1/36* (2017.01)

(56) References Cited

U.S. PATENT DOCUMENTS

| | | | | |
|---|---|---|---|---|
| 9,056,676 | B1* | 6/2015 | Wang | B64F 1/00 |
| 9,718,564 | B1* | 8/2017 | Beckman | G06Q 10/0832 |
| 10,407,182 | B1* | 9/2019 | Alcorn | B64C 39/024 |
| 2009/0314883 | A1* | 12/2009 | Arlton | B64C 39/024 244/63 |
| 2011/0068224 | A1* | 3/2011 | Kang | B64C 39/024 244/116 |
| 2014/0131507 | A1* | 5/2014 | Kalantari | A63H 27/12 244/2 |
| 2016/0137293 | A1* | 5/2016 | Santangelo | B64C 39/024 244/50 |
| 2016/0185466 | A1* | 6/2016 | Dreano, Jr. | G06Q 30/0635 705/26.81 |
| 2016/0196756 | A1* | 7/2016 | Prakash | B64C 39/024 701/3 |
| 2016/0280359 | A1* | 9/2016 | Semke | B64C 25/32 |
| 2016/0364989 | A1* | 12/2016 | Speasl | G08G 5/0034 |
| 2017/0050749 | A1 | 2/2017 | Pilskalns | |
| 2017/0129603 | A1* | 5/2017 | Raptopoulos | B64C 39/024 |
| 2017/0355459 | A1* | 12/2017 | Erickson | B64C 39/024 |
| 2019/0055018 | A1* | 2/2019 | Bei | B64C 39/024 |
| 2019/0244530 | A1* | 8/2019 | Chun | B64C 39/024 |
| 2019/0244533 | A1* | 8/2019 | Kim | B64C 39/024 |

* cited by examiner

METHOD AND SYSTEM FOR LANDING AN UNMANNED AERIAL VEHICLE

CROSS-REFERENCE TO RELATED APPLICATIONS

The disclosure claims priority to and the benefit of United Kingdom patent application No. GB1713161.6, filed Aug. 16, 2017, which is incorporated by reference herein in its entirety.

FIELD

This disclosure relates to a method and system for landing an unmanned aerial vehicle on another vehicle, and in particular, but not exclusively, relates to determining a speed differential between an unmanned aerial vehicle and the other vehicle.

BACKGROUND

An unmanned aerial vehicle (UAV), commonly known as a drone, is an aircraft that can be piloted by remote control and/or an on-board computer. This allows the UAV to be controlled without a human pilot being aboard the UAV. A UAV may form part of an unmanned aircraft system (UAS), which can include a UAV, a base station, for example a ground-based controller, and/or a system of communications between the UAV and the base station.

In some cases the base station may be configured to allow the UVA to land on the base station. For example, the base station may comprise a platform on which the UAV may land. When landing the UVA on the ground or on a ground-based base station, such as a static platform, it is desirable to land the drone as softly as possible so that the UAV and/or the base station are not damaged during the landing process. A soft landing can be achieved by ensuring that the speed of the drone is sufficiently low so as to not impart a large force to the ground and/or the base station as the UAV touches down.

With the advent of autonomous vehicles it desirable to be able land a UAV on the vehicle whilst the vehicle is moving. For example, the UAV may be configured to deliver cargo to the vehicle, and stopping the vehicle each time to allow the UAV to land may be inconvenient, or even dangerous.

However, landing a UAV on a moving vehicle can be difficult, since the UAV may not be able to account for unpredictable movements caused by turbulence and/or by the vehicle travelling over uneven ground.

SUMMARY

According to an aspect of the present disclosure there is provided a method of landing an unmanned aerial vehicle (UAV) on another vehicle, the method comprising: determining the velocity of the unmanned aerial vehicle; determining the velocity of the other vehicle; and adjusting the velocity of at least one of the unmanned aerial vehicle and the other vehicle to ensure that the difference between the velocity of the unmanned aerial vehicle and the velocity of the other vehicle is greater than a predetermined amount, e.g. a non-zero amount, as the unmanned aerial vehicle lands on the other vehicle.

The unmanned aerial vehicle may have a crash cage. The vehicle may have a base station configured to receive the unmanned aerial vehicle, e.g. the crash cage of the unmanned aerial vehicle. The method may comprise adjusting the velocity of at least one of the unmanned aerial vehicle and the vehicle to ensure that the difference between the velocity of the unmanned aerial vehicle and the velocity of the vehicle is above a predetermined amount as the crash cage engages the base station.

The predetermined velocity amount may be a value in the range of approximately 1 to 5 miles per hour. The predetermined velocity amount may be 3 miles per hour. The predetermined velocity amount may depend on the mass of the unmanned aerial vehicle. The predetermined velocity amount may depend on the mass of the other vehicle.

The difference, e.g. the vector difference, between the velocity of the unmanned aerial vehicle and the velocity of the vehicle may be determined by subtracting the velocity, e.g. the velocity vector, of the vehicle from the velocity, e.g. the velocity vector, of the unmanned aerial vehicle. Thus, the present disclosure provides a method of landing a unmanned aerial vehicle on a vehicle by ensuring that the vector difference between the velocity of the unmanned aerial vehicle and the vehicle is a non-zero amount, and in particular, ensuring that the vector difference between the velocity of the unmanned aerial vehicle and the vehicle has a magnitude greater than the predetermined amount.

The method may comprise determining the mass of the unmanned aerial vehicle. The method may comprise determining the mass of the other vehicle. The method may comprise determining the momentum of at least one of the unmanned aerial vehicle and the other vehicle. The method may comprise adjusting the velocity of at least one of the unmanned aerial vehicle and the other vehicle to ensure that the difference between the momentum of the unmanned aerial vehicle and the momentum of the other vehicle is greater than a predetermined amount of momentum.

The method may comprise determining the kinetic energy of at least one of the unmanned aerial vehicle and the other vehicle. The method may comprise adjusting the velocity of at least one of the unmanned aerial vehicle and the other vehicle to ensure that the difference between the kinetic energy of the unmanned aerial vehicle and the kinetic energy of the other vehicle is greater than a predetermined amount of kinetic energy.

The base station may comprise a deployable restraint configured to secure the unmanned aerial vehicle to the base station. The deployable restraint may comprise one or more securing members configured to attach the crash cage of the unmanned aerial vehicle to the base station. The method may comprise deploying the deployable restraint as the crash cage engages, e.g. first engages, the base station.

The crash cage may comprise a resilient structure, e.g. a semi-rigid structure, configured to deform upon the unmanned aerial vehicle impacting another article. The method may comprise determining the spring rate of the crash cage. The method may comprise determining the force at which the crash cage engages the base station. The method may comprise determining the maximum deformation of the crash cage as the crash cage engages the base station. The method may comprise deploying the deployable restraint before the crash cage reaches its maximum deformation.

The method may comprise determining the maximum possible velocity of the unmanned aerial vehicle, for example as a result of climatic conditions. The method may comprise adjusting the velocity of the other vehicle depending on the maximum possible velocity of the unmanned aerial vehicle. The method may comprise providing an indication to a driver of the other vehicle to slow down, for example to a velocity less than the velocity of the unmanned aerial vehicle.

The unmanned aerial vehicle may have a crash cage that is electrically connected to a battery management system of the unmanned aerial vehicle. The base station may have at least one electrode configured to connect electrically to the crash cage of the unmanned aerial vehicle. The method may comprise receiving the unmanned aerial vehicle at the base station. The method may comprise forming an electrical coupling between a power supply and the battery management system when the electrode is connected to the crash cage. The method may comprise charging the unmanned aerial vehicle by virtue of the electrical coupling, e.g. between the crash cage and the base station. The method may comprise charging the unmanned aerial vehicle by virtue of a wireless coupling, such as an inductive coupling.

According to another aspect of the present disclosure there is provided an unmanned aerial system having a controller operatively connectable to an unmanned aerial vehicle and another vehicle, the controller being configured to: determine the velocity of the unmanned aerial vehicle; determine the velocity of the other vehicle; and adjust the velocity of at least one of the unmanned aerial vehicle and the other vehicle to ensure that the difference between the velocity of the unmanned aerial vehicle and the velocity of the other vehicle is greater than a predetermined velocity amount as the unmanned aerial vehicle lands on the other vehicle.

According to another aspect of the present disclosure there is provided an unmanned aerial vehicle having a controller operatively connectable to another vehicle, the vehicle having a base station configured to receive the unmanned aerial vehicle, the controller being configured to: determine the velocity of the unmanned aerial vehicle; determine the velocity of the vehicle; and adjust the velocity of at least one of the unmanned aerial vehicle and the vehicle to ensure that the difference between the velocity of the unmanned aerial vehicle and the velocity of the vehicle is greater than a predetermined amount as the unmanned aerial vehicle lands on the vehicle.

According to another aspect of the present disclosure there is provided a vehicle configured to receive an unmanned aerial vehicle, the vehicle having a controller operatively connectable to the unmanned aerial vehicle, the controller being configured to: determine the velocity of the unmanned aerial vehicle; determine the velocity of the said vehicle; and adjust the velocity of at least one of the unmanned aerial vehicle and the vehicle to ensure that the difference between the velocity of the unmanned aerial vehicle and the velocity of the vehicle is greater than a predetermined amount as the unmanned aerial vehicle lands on the vehicle.

According to another aspect of the present disclosure there is provided a landing control method of an unmanned aerial system, the unmanned aerial system comprising an unmanned aerial vehicle, a base station provided on another vehicle, and a controller operatively connected to the unmanned aerial vehicle and the other vehicle, the method comprising: determining the velocity of the unmanned aerial vehicle; determining the velocity of the other vehicle; and adjusting the velocity of at least one of the unmanned aerial vehicle and the other vehicle to ensure that the difference between the velocity of the unmanned aerial vehicle and the velocity of the other vehicle is greater than a predetermined amount as the unmanned aerial vehicle lands on the vehicle.

According to another aspect of the present disclosure there is provided an unmanned aerial vehicle having a crash cage that is electrically connected to a battery management system of the unmanned aerial vehicle. The crash cage may comprise at least one electrode configured to connect the battery management system to an external power supply. The crash cage may comprise at least one electrically conductive crash member. The crash cage may at least partially surround the unmanned aerial vehicle. The crash cage may at least partially surround a propeller of the unmanned aerial vehicle. The crash cage may be coupled to a body of the unmanned aerial vehicle. The crash cage may be able to rotate relative to the body of the unmanned aerial vehicle.

According to another aspect of the present disclosure there is provided an unmanned aerial system comprising: an unmanned aerial vehicle having a crash cage that is electrically connected to a battery management system of the unmanned aerial vehicle; and a base station configured to receive the unmanned aerial vehicle, the base station having an electrode configured to connect electrically to the crash cage of the unmanned aerial vehicle, the unmanned aerial system being configured to form an electrical coupling between a power supply and the battery management system when the electrode is connected to the crash cage.

According to another aspect of the present disclosure there is provided a method of charging an unmanned aerial vehicle, the unmanned aerial vehicle having a crash cage that is electrically connected to a battery management system of the unmanned aerial vehicle, the method comprising: receiving the unmanned aerial vehicle at a base station, the base station having at least one electrode configured to connect electrically to the crash cage of the unmanned aerial vehicle; forming an electrical coupling between an external power supply and the battery management system when the electrode is connected to the crash cage; and charging the unmanned aerial vehicle by virtue of the electrical coupling.

A vehicle may be provided comprising one or more of the above mentioned unmanned aerial systems, unmanned aerial vehicles, controllers and/or base stations.

In the context of the present invention, the term "crash cage" is understood to mean any appropriate structure that at least partially surrounds an unmanned aerial vehicle to protect the unmanned aerial vehicle in the event of the unmanned aerial vehicle colliding with another article. For example, the crash cage may comprise a structure formed from at least one crash member, for example a bar, wire, wall, barrier or shield. The crash cage may be positioned to protect a propeller of the unmanned aerial vehicle. In one arrangement, the crash cage may comprise a structure that extends around the perimeter of the unmanned aerial vehicle, for example in a plane parallel to a radial plane of a propeller of the unmanned aerial vehicle. The crash cage may comprise a structure that is at least partially spherical in form. The crash cage may have a centre point that is aligned with a longitudinal axis of the unmanned aerial vehicle. The crash cage may have a centre point that is aligned with a longitudinal axis of a propeller of the unmanned aerial vehicle. The unmanned aerial vehicle may have a plurality of crash cages, for example, the unmanned aerial vehicle may have a crash cage located close to, or around, each propeller of the unmanned aerial vehicle. The crash cage may form a portion of, or be integrated into, a casing of the body of the unmanned aerial vehicle. For example, the unmanned aerial vehicle may have a casing surrounding a body portion, e.g. a portion located towards the centre of the unmanned aerial vehicle, the casing having one or more portions that extend at least partially around a propeller of the unmanned aerial vehicle.

In the context of the present invention, the term "battery management system" is understood to mean any electronic system that manages a rechargeable battery (cell or battery pack).

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

The present disclosure provides a method and system for landing an unmanned aerial vehicle (UAV) 101, e.g. a drone, on another vehicle 103. In the arrangement shown in the accompanying figures, the vehicle 103 is a pickup truck having an open cargo area, which may be adapted to receive the UAV 101. However, the other vehicle 103 may be any type of vehicle, such a car, a van, a truck, a marine vessel, an aircraft, or another UAV.

In many cases, the UAV 101 forms part of an unmanned aerial system (UAS) 107, which may also comprise a base station 109 configured to receive the UAV 101, and/or a controller 105 configured to control the operation of at least one of the UAV 101 and the base station 109. Where the base station 109 is provided on the vehicle 103, the controller 105 may be configured to control the operation of the vehicle 103. For example, the controller 105 may be configured to establish an operative connection between the UAV 101, the base station 109 and/or the vehicle 103 by virtue of one or more wired or wireless connections. In the arrangement shown in FIGS. 1a to 2, the controller 105 is provided on the vehicle 103, and forms part of the base station 109. However, the controller 105 may be provided at any appropriate location, for example the controller 105 may be a ground-based controller that is operatively connected to at least one of the base station 109, the vehicle 103 and the UAV 101.

The controller 105 may be configured to establish communication between the UAV 101 and the base station 109, for example by virtue of a dedicated short-range communication (DSRC) system, such that the controller 105 is able to control the position of the UAV relative to the base station 109. For example, the controller 105 may be configured to control the flight of the UAV 101 away from and back towards the base station 109. In particular, the controller 105 may be configured to land the UAV 101 on the base station 109, for example by controlling the relative speed between the UAV 101 and the base station 109. Where the base station 109 is provided on the vehicle 103, the controller 105 may be configured to control the velocity of at least one of the UAV 101 and the vehicle 103.

Figure 1A:
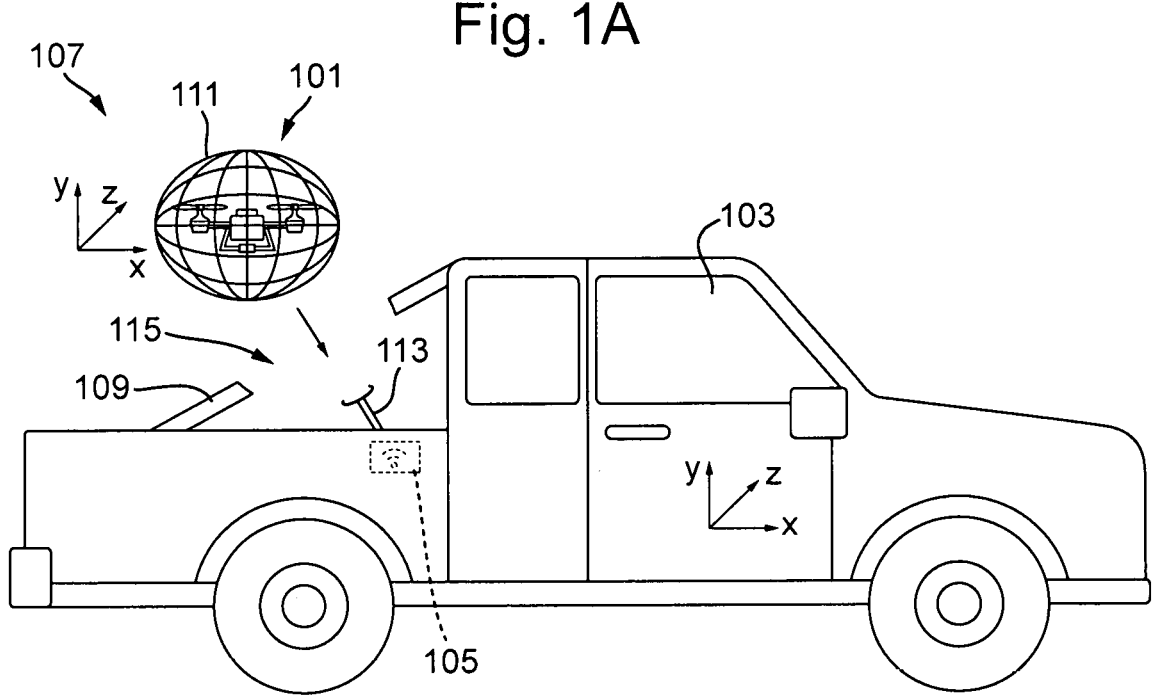
FIGS. 1A and 1B depict an unmanned aerial vehicle landing on another vehicle.

One of the problems associated with landing a UAV 101 on a moving vehicle 103 is that it is difficult to exactly match the velocities of the UAV 101 and the vehicle 103 to effect a controlled landing of the UAV 101 on the vehicle 103. For example, even when the vehicle 103 is traveling on a flat straight road, where the velocity of the vehicle 103 in the x, y and z directions (as shown in FIG. 1a) are relatively constant, it can still be difficult to land the UAV 101 on the vehicle 103 as a result of turbulence in the air surrounding the moving vehicle 103. However, in many cases, the road on which the vehicle 103 is travelling is not straight, and the terrain on which the vehicle 103 travels is uneven. As a result, the velocity of the vehicle 103 in the x, y and/or z directions may not be constant, and can sometimes be unpredictable.

Figure 3:
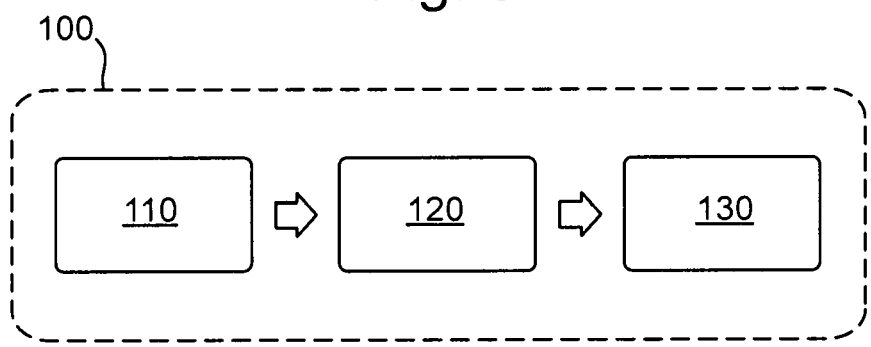
FIG. 3 depicts a method of landing an unmanned aerial vehicle.

The present disclosure is advantageous as it provides a method 100 and system for reliably landing the UAV 101 on a moving vehicle 103. The method 100, as shown in FIG. 3, comprises a step 110 of determining the velocity of the UAV 101. For example, the controller 105 may be configured to calculate the velocity of the UAV 101 in at least one of the x, y and z directions, for example by using data derived from one or more sensors of the UAV 101. In one arrangement, the controller 105 may be configured to communicate with an electronic control unit of the UAV 101 in order to determine the velocity of the UAV 101.

The method 100 comprises a step 120 of determining the velocity of the vehicle 103. For example, the controller 105 may be configured to calculate the velocity of the vehicle in at least one of the x, y and z directions, for example by using data derived from one or more sensors of the vehicle 103. In one arrangement, the controller 105 may be configured to communicate with an electronic control unit of the vehicle 103 in order to determine the velocity of the vehicle 103.

The method 100 comprises a step 130 of adjusting the velocity of at least one of the UAV 101 and the vehicle 103 to ensure that the difference between the velocity of the UAV 101 and the velocity of the vehicle 103 is greater than a predetermined amount as the UAV 101 lands on the vehicle 103. The velocity of the UAV 101 may be the vector sum of at least two of the x, y and z velocities of the UAV 101. The velocity of the vehicle 103 may be the vector sum of at least two of the x, y and z velocities of the vehicle 103.

The controller 105 may be configured to adjust the velocity of the UAV 101 and/or the vehicle 103 to ensure that the difference between the velocity of the UAV 101 and the velocity of the vehicle 103 is greater than approximately 3 miles per hour as the UAV 101 lands on, for example physically engages, the vehicle 103. As a result of the velocity differential between the UAV 101 and the vehicle 103, the UAV 101 has sufficient momentum to ensure that its approach towards the vehicle 103 is not affected by turbulent air surrounding the vehicle 103, and/or by unpredictable changes in the x, y and z velocities of the vehicle 103 caused by the road/terrain on which the vehicle 103 is travelling.

The UAV 101 may be provided with a crash cage 111 configured to protect the UAV 101 as the UAV 101 lands on the vehicle 103. In the arrangement shown in FIGS. 1a to 2, the UAV 101 has a substantially spherical crash cage that completely surrounds the UAV 101. However, the crash cage 111 may be of any appropriate configuration that enables the crash cage 111 to protect the UAV 101 as the UAV 101 lands on the vehicle 103. In particular, the crash cage 111 may be configured to absorb the landing energy resulting from the velocity differential between the UAV 101 and the vehicle 103.

Figure 1B:
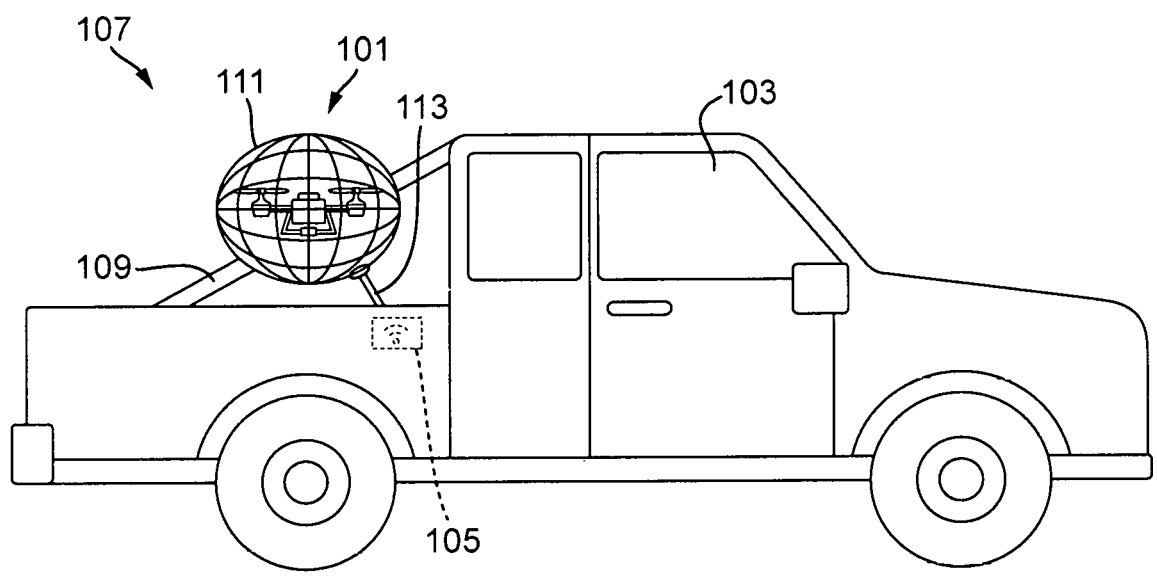

FIGS. 1a and 1b depict the UAV 101 landing on the base station 109, which is provided in the rear cargo area of the vehicle 103. The base station 109 has a recess configured to receive the crash cage 111 of the UAV 101 as the UAV 101 lands on the vehicle 103. The recess has opening 115 sized so as to not allow the UAV 101 completely through the opening 115. In this manner, as the UAV 101 is received in the recess of the base station 109, the crash cage 111 of the UAV 101 engages a wall of the opening 115 to locate the UAV 101 relative to the base station 109. In the arrangement shown in FIGS. 1a to 2, the opening 115 is a simple cut-out in a body portion of the base station 109. However, the opening 115, the recess, and the body portion may be of any appropriate shape. For example, the recess may be conical in form, so that the crash cage 111 of the UAV 101 becomes lodged in the recess as the UAV 101 lands on the vehicle 103. In another arrangement (not shown), the base station 109 may comprise a net configured to catch the UAV 101 as the UAV 101 lands on the vehicle 103.

The base station 109 may comprise a deployable restraint 113 configured to secure the UAV 101 to the base station 109. For example, the deployable restraint 113 may comprise at least one securing member, e.g. a catch, configured to attach to the crash cage 111 of the UAV 101. The deployable restraint 113 may be caused to deploy from the base station 109 as the UAV 101 lands on the base station 109. For example, the deployable restraint 113 may be caused to deploy from the base station 109 as the crash cage 111 of the UAV 101 engages the opening 115 of the recess in the base station 109. In one arrangement, the deployable restraint 113 may be caused to deploy from the base station 109 upon first contact between a wall of the opening 115 and the crash cage 111 of the UAV 101. In other words, the crash cage 111 of the UAV 101 need not be fully engaged with the opening 115 to cause the deployable restraint 113 to deploy.

Where the crash cage 111 comprises a resilient structure, such as a semi-rigid cage, the method 100 may comprise determining the spring rate of the crash cage 111, i.e. the amount by which the crash cage 111 deforms for a given load. The method 100 may also comprise determining the force at which the crash cage 111 engages the base station 109 as the UAV 101 lands on the vehicle 103. The force may be determined using any appropriate method, for example by multiplying the mass of the UAV 101 by its acceleration as the UAV 101 engages the base station 109.

The method 100 may comprise determining the maximum deformation of the crash cage 111 as the crash cage 111 engages the base station 109. For example, the maximum deformation of the crash cage 111 can be determined using the determined spring rate of the crash cage 111, and the force at which the crash cage 111 impact the base station 109.

In order to ensure that the UAV 101 does not bounce off of the base station 109, the method may comprise deploying the deployable restraint 113 before the crash cage 111 reaches its maximum deformation. In this manner, all of the landing energy of the UAV 101 may be use to maintain contact between the UAV 101 and the base station 109 as the UAV 101 lands on the vehicle 103.

In FIG. 1a, the UAV 101 is travelling towards the vehicle 103 at a first velocity $V_{UAV}$ and the vehicle 103 is travelling at a second velocity $V_v$. In order to ensure that the momentum of the UAV 101 is sufficient to carry the UAV 101 through any turbulence behind the vehicle 103, and/or to ensure that the UAV 101 lands with sufficient force to overcome any unpredicted movements, e.g. jolts or jars, in the vehicle body, the controller 105 may be configured to cause an increase in the velocity of the UAV 101 such that the first velocity $V_{UAV}$ is greater than the second velocity $V_v$ by a predetermined amount. Additionally or alternatively, the controller 105 may be configured to cause a reduction in the velocity of the vehicle 103 such that the first velocity $V_{UAV}$ is greater than the second velocity $V_v$ by a predetermined amount.

The predetermined amount of the velocity differential may be an amount in the range of approximately 1 to 5 miles per hour. However, the predetermined amount of the velocity differential may be any appropriate amount to ensure that the UAV 101 lands with sufficient force to avoid the UAV 101 being displaced away from the vehicle 103 as the UAV 101 approaches and lands on the vehicle 103.

The method 100 may comprise a step of determining the maximum possible velocity of the UAV 101. For example, where the UAV 101 is flying in windy conditions and/or is carrying a load, the maximum possible velocity of the UAV 101 may be less than it would be when flying in less windy conditions and/or not carrying a load. As such, the vehicle 103 may be travelling at a velocity greater than that of the UAV 101. In order to allow the UAV 101 to catch up with the vehicle 103, the method 100 may comprise a step of slowing the vehicle 103 to a velocity less than that of the UAV 101. The step of slowing the vehicle 103 to a velocity less than that of the UAV 101 may be a separate step to step 130 mentioned above, or may be carried out at as part of step 130.

In FIG. 1b, the crash cage 111 of the UAV 101 has engaged the opening 115 to cause the deployable restraint 113 to attach to the crash cage 111 of the UAV 101, which secures the UAV 101 in position on the base station 109.

The method 100 may comprise a step of determining the mass of at least one of the UAV 101 and the vehicle 103. For example, the mass of each of the UAV 101 and vehicle 103 may vary through the course of their respective journeys. In one scenario, the UAV 101 may be configured to transport one or more articles of cargo, and as such, the mass of the UAV 101 may vary depending on the cargo which it is carrying, if any. Similarly, the mass of the vehicle 103 may vary depending on the cargo which it is carrying. Additionally or alternatively, the mass of each of the UAV 101 and the vehicle 103 may vary depending on the amount of fuel being carried.

Where the velocity and the mass of each of the UAV 101 and the vehicle 103 is known, the method 100 may comprise a step of determining the momentum of each of the UAV 101 and the vehicle 103. The method 100 may comprise adjusting the velocity of at least one of the UAV 101 and the vehicle 103 to ensure that the difference between the momentum of the UAV 101 and the momentum of the vehicle 103 is greater than a predetermined momentum value.

Figure 2:
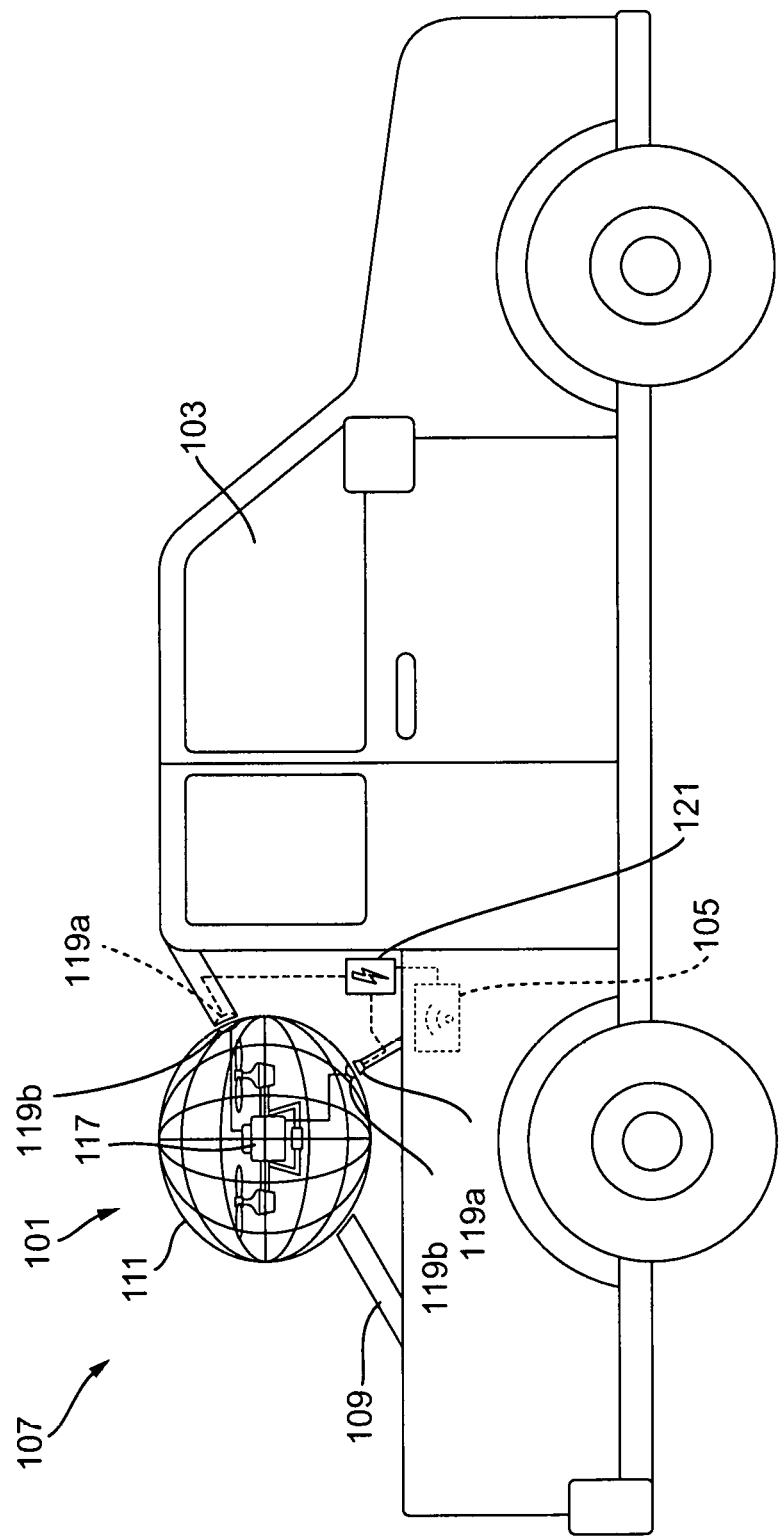
FIG. 2 shows an unmanned aerial system.

FIG. 2 shows an arrangement of the UAS 107 in which the crash cage 111 of the UAV 101 is electrically connected to a battery management system 117 of the UAV 101. The base station 109 is provided with a power supply 121 that is electrically coupled to at least one electrode 119a configured to contact the crash cage 111 when the crash cage 111 is received in the opening 115 of the base station 109. In the arrangement shown in FIG. 2, the base station 109 has an electrode 119a provided in a wall of the opening 115, and another electrode 119a provided in the deployable restraint 113.

In order to provide an electrical coupling between the power supply 121 and the battery management system 117 of the UAV 101, the crash cage 111 is provided with electrodes 119b configured to connect to the electrodes 119a of the base station 109, and thus complete the electrical coupling between the power supply 121 and the battery management system 117 when the crash cage 111 of the UAV 101 is received in the opening 115. As such, the method 100 may comprise a step of charging the UAV 101 by virtue of the electrical coupling between the UAV 101 and the base station 109.

The electrodes 119b may be provided on any appropriate portion of the crash cage 111. In one arrangement, the crash cage 111 may comprise one or more electrically conductive crash members which function as the electrodes 119b. The conductive crash member may extend at least partially around the circumference of the crash cage 111, so that the orientation of the UAV 101 in the base station 109 does not affect the ability of the base station 109 to charge the UAV 101.

The present disclosure thus provides an improved system and method 100 for landing a UAV 101 on a vehicle 103. In particular, the UAV 101 and UAS 107 disclosed herein are advantageous as they allow for the UAV 101 to be landed on a moving vehicle, which is a challenge facing vehicle manufactures with the advent of autonomous and semi-autonomous vehicles. Indeed, the present disclosure allows for a fully autonomous landing procedure for landing an autonomous UAV on another autonomous vehicle.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

That which is claimed is:

1. A method of landing an unmanned aerial vehicle on a vehicle, wherein the unmanned aerial vehicle has a crash cage, wherein the vehicle has a base station configured to receive the crash cage of the unmanned aerial vehicle, and wherein the crash cage is a resilient structure, the method comprising:
   determining a velocity of the unmanned aerial vehicle;
   determining a velocity of the vehicle;
   adjusting the velocity of at least one of the unmanned aerial vehicle and the vehicle to ensure that a difference between the velocity of the unmanned aerial vehicle and the velocity of the vehicle is greater than a predetermined amount as the unmanned aerial vehicle physically engages the vehicle;
   adjusting the velocity of at least one of the unmanned aerial vehicle and the vehicle to ensure that the difference between the velocity of the unmanned aerial vehicle and the velocity of the vehicle is above a predetermined value as the crash cage engages the base station;
   determining a spring rate of the crash cage;
   determining a force at which the crash cage engages the base station;
   determining a maximum deformation of the crash cage as the crash cage engages the base station; and
   deploying a deployable restraint before the crash cage reaches its maximum deformation.

2. A method according to claim 1, wherein the base station comprises the deployable restraint configured to secure the unmanned aerial vehicle to the base station, the method comprising:
   deploying the deployable restraint as the crash cage engages the base station.

3. A method according to claim 1, the method comprising:
   determining a mass of the unmanned aerial vehicle;
   determining a mass of the vehicle;
   adjusting the velocity of at least one of the unmanned aerial vehicle and the vehicle to ensure that a difference between a momentum of the unmanned aerial vehicle and a momentum of the vehicle is greater than a predetermined momentum amount.

4. A method according to claim 1, the method comprising:
   determining a mass of the unmanned aerial vehicle;
   determining a mass of the vehicle;
   adjusting the velocity of at least one of the unmanned aerial vehicle and the vehicle to ensure that a difference between a kinetic energy of the unmanned aerial vehicle and a kinetic energy of the vehicle is greater than a predetermined kinetic energy amount.

5. A method according to claim 1, the method comprising:
   determining a maximum possible velocity of the unmanned aerial vehicle;
   adjusting the velocity of the vehicle depending on the maximum possible velocity of the unmanned aerial vehicle.

6. A method according to claim 1, wherein the unmanned aerial vehicle has the crash cage that is electrically connected to a battery management system of the unmanned aerial vehicle, the method comprising:
   receiving the unmanned aerial vehicle at the base station, the base station having at least one electrode configured to connect electrically to the crash cage of the unmanned aerial vehicle;
   forming an electrical coupling between a power supply and the battery management system when the at least one electrode is connected to the crash cage; and
   charging the unmanned aerial vehicle by virtue of the electrical coupling.

7. An unmanned aerial system having a controller operatively connectable to an unmanned aerial vehicle and a vehicle, the controller being configured to:
   determine a velocity of the unmanned aerial vehicle;
   determine a velocity of the vehicle;
   adjust the velocity of at least one of the unmanned aerial vehicle and the vehicle to ensure that a difference between the velocity of the unmanned aerial vehicle and the velocity of the vehicle is greater than a predetermined amount as the unmanned aerial vehicle physically engages the vehicle;
   determine a mass of the unmanned aerial vehicle;
   determine a mass of the vehicle; and
   adjust the velocity of at least one of the unmanned aerial vehicle and the vehicle to ensure that a difference between a momentum of the unmanned aerial vehicle and a momentum of the vehicle is greater than a predetermined momentum amount.

8. An unmanned aerial system according to claim 7, wherein the unmanned aerial vehicle comprises a crash cage, and wherein the vehicle comprises a base station configured to receive the crash cage of the unmanned aerial vehicle.

9. An unmanned aerial system according to claim 8, wherein the base station comprises a recess configured to receive the crash cage of the unmanned aerial vehicle.

10. An unmanned aerial system according to claim 9, wherein the recess of the base station has an opening that is smaller than the crash cage of the unmanned aerial vehicle.

11. An unmanned aerial vehicle and/or a vehicle having a controller, the vehicle being configured to receive the unmanned aerial vehicle, the controller being configured to:
  determine a velocity of the unmanned aerial vehicle;
  determine a velocity of the vehicle;
  adjust the velocity of at least one of the unmanned aerial vehicle and the vehicle to ensure that a difference between the velocity of the unmanned aerial vehicle and the velocity of the vehicle is greater than a predetermined amount as the unmanned aerial vehicle physically engages the vehicle;
  determine a mass of the unmanned aerial vehicle;
  determine a mass of the vehicle; and
  adjust the velocity of at least one of the unmanned aerial vehicle and the vehicle to ensure that a difference between a kinetic energy of the unmanned aerial vehicle and a kinetic energy of the vehicle is greater than a predetermined kinetic energy amount.

* * * * *